C. K. HANN.
GRASS CATCHER.
APPLICATION FILED FEB. 8, 1909.
954,569.
Patented Apr. 12, 1910.
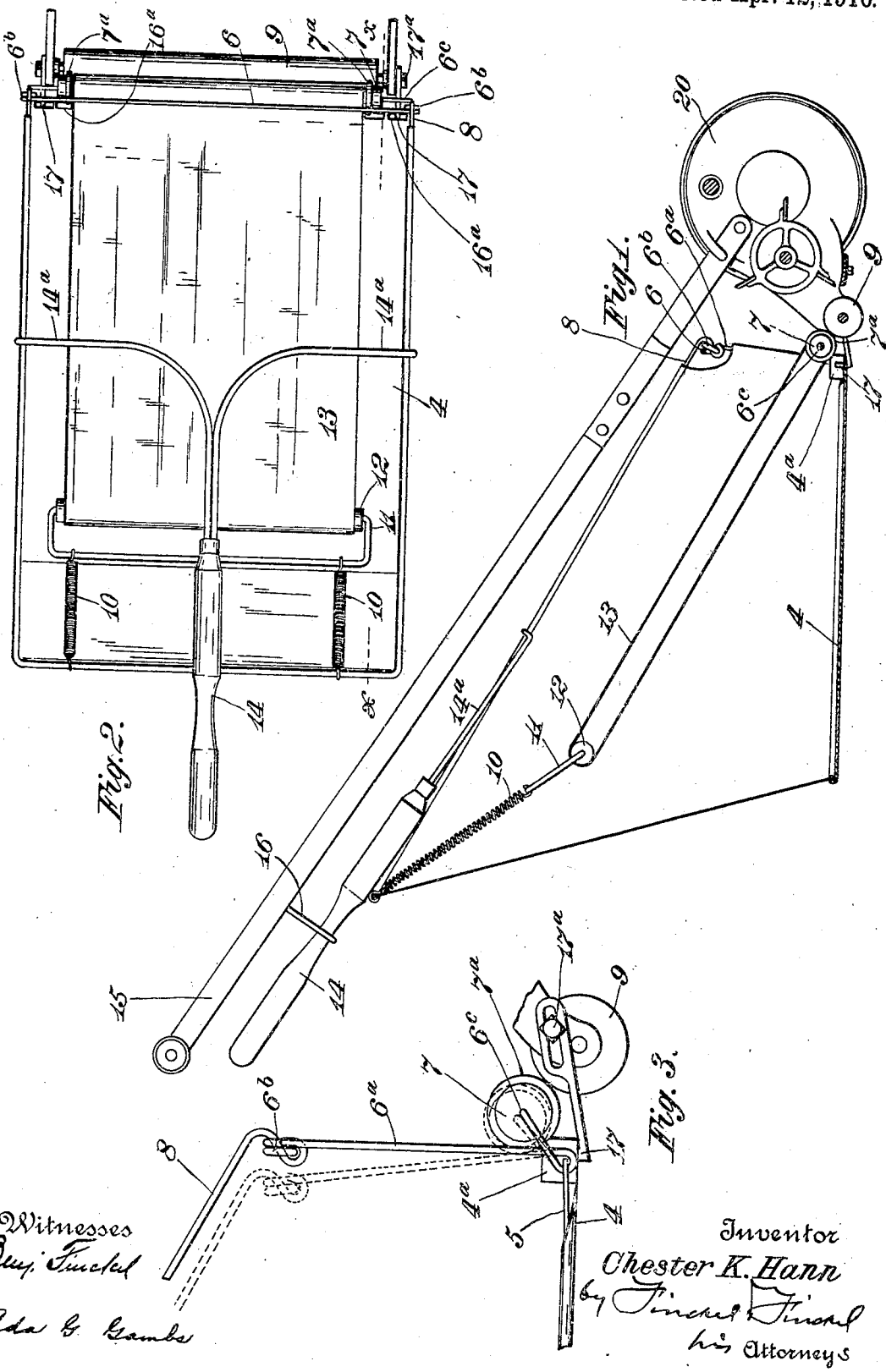
Witnesses
Benj. Finckel
Ada G. Gambs
Inventor
Chester K. Hann
by Finckel & Finckel
his Attorneys

UNITED STATES PATENT OFFICE.

CHESTER K. HANN, OF COLUMBUS, OHIO, ASSIGNOR TO ALICE M. HANN, OF COLUMBUS, OHIO.

GRASS-CATCHER.

954,569.      Specification of Letters Patent.      Patented Apr. 12, 1910.

Application filed February 8, 1909. Serial No. 476,795.

*To all whom it may concern:*

Be it known that I, CHESTER K. HANN, citizen of the United States, residing at Columbus, in the county of Franklin and State of Ohio, have invented a certain new and useful Improvement in Grass-Catchers, of which the following is a specification.

The object of this invention is to provide improved means for carrying the grass as it is cut to the rear portion of the catcher, and thereby avoid its undue accumulation at the front portion of the catcher where it is likely to spill out or interfere with the operation of the mower.

The invention is embodied in the construction hereinafter described and claimed, the invention not being confined to the exact form of the parts shown.

In the accompanying drawings—Figure 1 is a vertical sectional view of my invention on the line $x$—$x$, Fig. 2, showing it applied to a mower. Fig. 2 is a plan view with parts of the mower omitted. Fig. 3 is a detail in vertical view illustrating the construction of the forward portion of the catcher frame.

The catcher frame comprises a sheet metal bottom 4, the side edges of which are turned over a wire frame including side portions. The side portions 5 have their forward ends hooked into tongues $4^a$ bent up from the bottom piece. The upright forward portion of the catcher frame consists generally of a wire having a horizontal top portion 6 with legs $6^a$. The junction of the portions 6 and $6^a$ are coiled as seen at $6^b$ and the lower ends of the legs $6^a$ are looped about the wire of the frame 5 and then bent inward as seen at $6^c$ to form journals for a roller 7. The said roller 7 is thus movably mounted with reference to the mower roller.

The upper portion of the catcher frame includes side wires 8 bent at their forward ends in goose-neck form and to pass from the forward side of the frame inward through the coils at $6^b$ and then upward in hook form around the wire of the coil $6^b$ so as to form a connection that can be flexed rearward but not forward as best depicted in Fig. 3. The roller 7 is provided with annularly projecting rubber bands or other suitable friction devices $7^a$ to engage the rear or ground roller 9 of the mower 20, and the function of the peculiar connection between the upper and forward portions of the catcher frame is principally twofold, first, to permit the upper portion of the forward portion of the catcher frame to be drawn rearward to lift the roller 7 or its friction devices $7^a$ off the mower roller 9; and, second, to permit the frame to be folded down flat for packing in crates for transportation. A further advantage of the construction is that the frame is prevented from flexing forward onto the knives of the mower.

Suspended within the catcher by coil springs 10 attached at one end to the rear portion of the upper wire of the catcher frame is a small wire frame 11 carrying a roller 12. The springs 10 hold the belt taut and permit the catcher to be folded down flat without their detachment. Passed around the rollers 12 and 7 is an endless belt 13 of canvas or other suitable material. When the mower is pushed forward as in cutting grass the upper portion of the belt 13 is moved rearward by reason of the operation of the rear mower-roller 9 on the forward belt-roller 7, and cut grass thrown out at the rear of the mower is deposited on the belt and carried to the rear of the catcher where it accumulates.

14 designates a handle for the catcher, said handle having divergent wires $14^a$ rigidly secured to the upper side wires of the catcher frame.

15 designates the handle of the mower. The catcher at its rear is removably supported by a hook 16 on the mower handle. At its forward end the catcher is removably secured to the mower on hooks 17 that are secured by nuts $17^a$ on the brackets that support the rear roller of the mower. Suitable holes in the metallic bottom can be provided to receive the hooks 17. To prevent any movement of the belt 13 when the mower is pulled backward (as is frequently necessary) the catcher handle is drawn rearward, thus separating the driven roller 7 from the mower roller 9. The rubber bands or friction devices are made projecting so as to prevent contact of the belt 13 with the mower roller. Several pairs of the holes $16^a$ can be provided to adapt the catcher to different sizes of mower. The catcher frame is covered at its rear end and sides in the usual manner with flexible canvas.

The catcher as thus described is adapted for attachment to most, if not all, of the lawn mowers now on the market, that illustrated at 20 being of an ordinary construction.

What I claim and desire to secure by Letters Patent is:

1. In a grass catcher for lawn mowers, the combination with the catcher frame, of a roller journaled in the forward portion of the catcher frame and provided with friction bands adapted to engage the rear roller of the mower to be rotated thereby, a second roller mounted in the catcher and an endless belt supported by the said rollers of the catcher.

2. In a grass catcher for lawn mowers, the combination with the catcher frame, of a roller journaled in the forward portion of the catcher frame and adapted to engage and be rotated by the roller of the mower, a second rear roller in the catcher frame and means for yieldingly mounting the same in the catcher, and an endless belt supported by the said rollers of the catcher.

3. In a grass catcher for lawn mowers, the combination with a catcher frame, of a roller connected with and supported by that frame, said roller adapted to be engaged and rotated by the rear or ground roller of the mower, a second roller yieldingly connected with the catcher frame, an endless belt supported by the rollers that are connected with the catcher frame, and means whereby the first mentioned roller can be separated from the mower roller while the catcher remains in place.

4. In a grass catcher for lawn mowers, a catcher frame including upper side members, and forward upright side members hinged together to flex rearwardly, and a belt-supporting roller adapted to engage the rear roller of the mower, said belt roller carried by the said forward upright side members.

5. In a grass catcher for lawn mowers, a catcher frame including upper side members, and forward upright side members, hinged together to flex rearwardly, a belt-supporting roller adapted to engage the rear roller of the mower, said belt roller carried by said forward upright side members, and a rearwardly extending handle connected with said members to flex said members.

6. In a grass catcher for lawn mowers, the combination with the bottom frame, of the forward catcher-frame-members hinged to the bottom frame at their lower ends and provided with coils at their upper ends, an upper frame-member comprising side wires, 8, bent at their forward ends in goose-neck form and extending from the forward side of the forward frame-members rearward through the said coils of the forward frame-members and connected therewith, substantially as shown and described.

CHESTER K. HANN.

Witnesses:
BENJ. FINCKEL,
ADA G. GAMBS.